(12) United States Patent
Makino et al.

(10) Patent No.: US 11,142,855 B2
(45) Date of Patent: Oct. 12, 2021

(54) FINE FIBER PRODUCING METHOD AND FINE FIBER PRODUCING APPARATUS

(71) Applicant: FPS INC., Tokyo (JP)

(72) Inventors: Hiroshi Makino, Tokyo (JP); Akihiro Saito, Tokyo (JP)

(73) Assignee: Yamashin-Filter Corp., Yokohama (JP)

( * ) Notice: Subject to any disclaimer, the term of this patent is extended or adjusted under 35 U.S.C. 154(b) by 371 days.

(21) Appl. No.: 16/310,151

(22) PCT Filed: Aug. 10, 2017

(86) PCT No.: PCT/JP2017/029183
§ 371 (c)(1),
(2) Date: Mar. 13, 2019

(87) PCT Pub. No.: WO2018/030530
PCT Pub. Date: Feb. 15, 2018

(65) Prior Publication Data
US 2021/0079573 A1  Mar. 18, 2021

(30) Foreign Application Priority Data

Aug. 10, 2016 (JP) .............................. JP2016-158236

(51) Int. Cl.
*D01D 4/02* (2006.01)
*D01D 5/04* (2006.01)
(Continued)

(52) U.S. Cl.
CPC ............... *D04H 3/16* (2013.01); *D01D 4/025* (2013.01); *D01D 5/0985* (2013.01); *D04H 1/43838* (2020.05); *D04H 1/724* (2013.01)

(58) Field of Classification Search
CPC ............ D01D 4/02; D01D 4/025; D01D 5/04; D01D 5/08; D01D 5/084; D01D 5/0985;
(Continued)

(56) References Cited

U.S. PATENT DOCUMENTS 4,060,355 A   11/1977  Walz et al.
4,855,179 A *  8/1989  Bourland ................. D01D 5/04
                                               264/518 X
(Continued)

FOREIGN PATENT DOCUMENTS

CN        1033659 A    7/1989
CN        1234922 C    1/2006
(Continued)

OTHER PUBLICATIONS

Translation of JP-62184107-A (published on Aug. 12, 1987).*
(Continued)

*Primary Examiner* — Leo B Tentoni
(74) *Attorney, Agent, or Firm* — Kilpatrick Townsend & Stockton LLP

(57) ABSTRACT

A fine fiber production method and a fine fiber production apparatus are provided. The fine fiber production method includes: discharging a flowable polymer compound from a discharge port provided at an extruder; forming fibers having a fiber diameter of from 50 nm to 15 μm by spraying, in a direction intersecting with a discharge direction of the flowable polymer compound, a pressurized gas from an air nozzle to the discharged flowable polymer compound, the air nozzle including a temperature control member and a spindle-shaped nozzle or a De Laval nozzle; and collecting the fibers using a collection member provided downstream in a gas spraying direction.

12 Claims, 4 Drawing Sheets

(51) Int. Cl.

| | |
|---|---|
| *D01D 5/08* | (2006.01) |
| *D01D 5/084* | (2006.01) |
| *D01D 7/00* | (2006.01) |
| *D01D 13/00* | (2006.01) |
| *D01D 13/02* | (2006.01) |
| *D04H 1/425* | (2012.01) |
| *D04H 1/4266* | (2012.01) |
| *D04H 1/435* | (2012.01) |
| *D04H 1/732* | (2012.01) |
| *D04H 3/011* | (2012.01) |
| *D04H 3/015* | (2012.01) |
| *D04H 3/016* | (2012.01) |
| *D04H 3/03* | (2012.01) |
| *D04H 3/033* | (2012.01) |
| *D04H 3/16* | (2006.01) |
| *D04H 1/724* | (2012.01) |
| *D01D 5/098* | (2006.01) |
| *D04H 1/4382* | (2012.01) |

(58) Field of Classification Search
CPC .......... D01D 7/00; D01D 13/00; D01D 13/02; D04H 1/425; D04H 1/4266; D04H 1/435; D04H 1/43838; D04H 1/732; D04H 3/011; D04H 3/015; D04H 3/016; D04H 3/03; D04H 3/033
USPC ............. 264/12, 103, 204, 205, 207, 211.12, 264/211.14, 211.17, 330, 331.12, 517, 264/518, 555; 425/7, 72.2, 80.1, 83.1, 425/377, 378.1, 382.2
See application file for complete search history.

(56) References Cited

U.S. PATENT DOCUMENTS

| | | |
|---|---|---|
| 5,075,161 A | 12/1991 | Nyssen |
| 6,800,226 B1 | 10/2004 | Gerking |
| 6,908,292 B2 | 6/2005 | Reifenhaeuser |
| 2005/0048152 A1 | 3/2005 | Gerking |
| 2006/0057922 A1 | 3/2006 | Bond |
| 2006/0258833 A1* | 11/2006 | Senda .................. C09D 167/04 528/272 |

FOREIGN PATENT DOCUMENTS

| | | | |
|---|---|---|---|
| CN | 202193884 U | 4/2012 | |
| JP | 62184107 A * | 8/1987 | ............. D01D 5/092 |
| JP | H01282308 A | 11/1989 | |
| JP | 2003503604 A | 1/2003 | |
| JP | 2009041128 A | 2/2009 | |
| JP | 2010236174 A | 10/2010 | |
| JP | 2012122176 A | 6/2012 | |
| WO | 2015145880 A1 | 10/2015 | |

OTHER PUBLICATIONS

Office Action dated Jan. 12, 2021 in Application CN201780048793.6.
International Search Report dated Nov. 7, 2017 in PCT/JP2017/029183, 4 pages.
Extended European Search Report in 17839594.3 dated Oct. 25, 2019, 7 pages.
Office Action in CN201780048793.6, dated Jun. 22, 2021.

* cited by examiner

FINE FIBER PRODUCING METHOD AND FINE FIBER PRODUCING APPARATUS

TECHNICAL FIELD

The present disclosure relates to a fine fiber production method and a fine fiber production apparatus.

BACKGROUND ART

Use of fine fibers having a submicron-order or nano-order diameter has been desired in fiber laminates used in sound absorbing materials, heat insulating materials, heat shielding materials, damping materials, wiping materials, polishing agent holders, puff materials, air filters, battery separators, heat-sealing sheets, medical materials and the like, it is desired to in order to achieve a compact structure and flexibility.

Conventionally, ESD (Electro-Spray Deposition) method has been known as a method of producing nanofibers from a solvent solution of a polymer. The ESD method is a method in which a solvent solution of a polymer contained in a vessel is transferred to a needle-form nozzle applied with a high voltage and thereby imparted with a charge so as to induce primary dielectric explosion and draw the polymer solution explosively, whereby fine fibers are formed. However, this method has problems in that it requires a complex apparatus for the high voltage application and that only a small amount of fibers can be produced from a single nozzle.

As a method of producing a large amount of nanofibers by ESD, there has been proposed a nanofiber production method which utilizes electrical potential control and compressed air by arranging a nozzle, to which a high voltage is applied from a high voltage generation section and a tube is connected at a rear end thereof such that a solvent solution of a polymer can be transferred thereto by a pump, along with an air blower which is provided behind the nozzle and discharges compressed air (see Japanese Patent Application Laid-Open (JP-A) No. 2012-122176).

Further, there has been proposed a method and an apparatus for producing nanofibers, which apparatus includes a rotary vessel having plural small holes in an electrostatic region and a ring-shaped electrode surrounding the rotary vessel and in which fibers extruded from the small holes of the rotary vessel by high voltage application thereto are discharged by a discharge means such as a jet fan (see JP-A No. 2009-41128).

SUMMARY OF INVENTION

Technical Problem

However, the nanofiber production methods described in JP-A No. 2012-122176 and JP-A No. 2009-41128 both have a problem in that high voltage application is necessary and this makes an apparatus therefor be in a larger-scale. In addition, there are also problems in, for example, that it is difficult to control the fiber diameter via voltage control, that only fibers of a uniform diameter can be produced, and that it cannot perform spinning on a large quantity.

An object of one embodiment of the invention is to provide a fine fiber production method by which fibers of a desired diameter can be produced in a simple manner without requiring a large-scale apparatus.

An object of another embodiment of the invention is to provide a fine fiber production apparatus which is capable of producing fibers of a desired diameter in a simple manner.

Solution to Problem

The means for solving the above-described problems encompasses the following embodiments.

<1> A method of producing fine fibers, the method comprising:
discharging a flowable polymer compound from a discharge port provided at an extruder;
forming fibers having a fiber diameter of from 50 nm to 15 μm by spraying, in a direction intersecting with a discharge direction of the flowable polymer compound, a pressurized gas from an air nozzle to the discharged flowable polymer compound, the air nozzle comprising a temperature control member and a spindle-shaped nozzle or a De Laval nozzle; and
collecting the fibers using a collection member provided downstream in a gas spraying direction.

<2> The method of producing fine fibers according to <1>, further comprising a heating step of increasing an ambient temperature in a vicinity of the flowable polymer compound discharged from the discharge port.

<3> The method of producing fine fibers according to <1> or <2>, wherein the collecting of the fibers includes collecting the fibers on a nonwoven fabric to form a sheet.

<4> The method of producing fine fibers according to <1> to <3>, wherein a speed of the gas discharged from the air nozzle is 30 m/sec or more.

<5> The method of producing fine fibers according to <1> to <4>, wherein the flowable polymer compound is a heat-melted thermoplastic resin, and a temperature of the gas discharged from the air nozzle is from 100° C. to 900° C.

<6> The method of producing fine fibers according to <5>, wherein a melt flow rate as measured according to ISO 1133, JIS K7210:1999 of the thermoplastic resin is in a range of from 1 g/10 min to 2,500 g/10 min, and an amount of the thermoplastic resin discharged per discharge port is in a range of from 0.5 g/min to 250 g/min.

<7> The method of producing fine fibers according to <1> to <4>, wherein the flowable polymer compound is a solution or a dispersion of a thermosetting resin, and a temperature of the gas discharged from the air nozzle is from −40° C. to 400° C.

<8> The method of producing fine fibers according to <1> to <4>, wherein the flowable polymer compound is a solution or a dispersion of at least one biocompatible polymer compound selected from the group consisting of polyester resins, proteins and polysaccharides, and a temperature of the gas discharged from the air nozzle is from −40° C. to 300° C.

<9> An apparatus for producing fine fibers, the apparatus comprising:
an extruder that comprises a plurality of discharge ports and that is configured to discharge a flowable polymer compound from each of the discharge ports;
an air nozzle member that is provided in a vicinity of the plurality discharge ports of the extruder and that comprises a De Laval nozzle or a spindle-shaped nozzle, the air nozzle member being equipped with a gas pressurization unit that is configured to pressurize a gas to be sprayed in a direction intersecting with a discharge direction of the flowable polymer compound discharged from the discharge ports, and a temperature control member that is configured to control a temperature of the gas; and a collection member configured to collect formed fibers.

<10> The apparatus for producing fine fibers according to <9>, further comprising a heating device that increases an ambient temperature in a vicinity of the flowable polymer compound discharged from the discharge ports.

<11> The apparatus for producing fine fibers according to <9> or <10>, wherein the extruder is a melt extruder.

<12> The apparatus for producing fine fibers according to any one of <9> to <11>, wherein the extruder comprises an extrusion pump that pressurizes the flowable polymer compound and thereby transfers the flowable polymer compound to the discharge ports.

Effects of Invention

According to one embodiment of the invention, a fine fiber production method by which fibers of a desired diameter can be produced in a simple manner without requiring a large-scale apparatus can be provided.

According to another embodiment of the invention, a fine fiber production apparatus which is capable of producing fibers of a desired diameter in a simple manner can be provided.

DESCRIPTION OF EMBODIMENTS

Mode for Carrying Out the Invention

Figure 1:
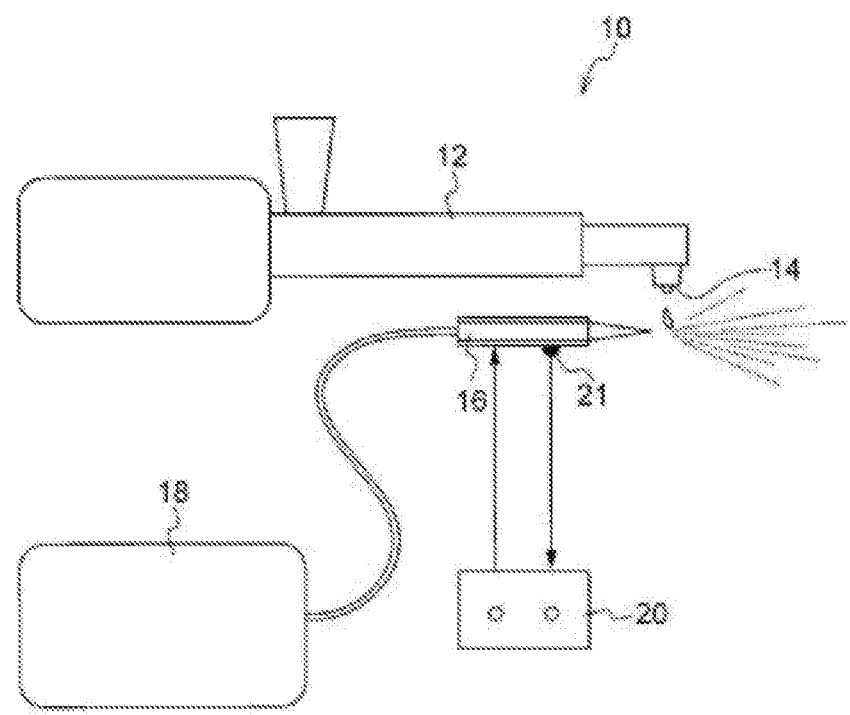
FIG. 1 is a schematic structural view illustrating one embodiment of a fine fiber production apparatus used for the fine fiber production method of the disclosure.

Embodiments of the fine fiber production method of the disclosure are described below in detail. It is noted here, however, that the disclosure is not restricted to the following embodiments. In the following embodiments, the constituents thereof (including element steps and the like) are not indispensable except for those cases where otherwise specified or they are clearly indispensable in principle. The same applies to the numerical values and ranges thereof, without restricting the disclosure.

In the present specification, the term "fine fiber" refers to a fiber having a nano-order to micron-order diameter, more specifically, a fiber having a diameter of from 50 nm to 15 μm.

In the present specification, the term "step" encompasses not only discrete steps but also steps which cannot be clearly distinguished from other steps as long as the intended purpose of the step is achieved.

In the present specification, those numerical ranges that are expressed with "to" each denote a range that includes the numerical values stated before and after "to" as the minimum value and the maximum value, respectively.

In the present specification, when reference is made to an amount of a component contained in a composition and there are plural substances corresponding to the component in the composition, the indicated amount of the component means the total amount of the plural substances existing in the composition unless otherwise specified.

In the present specification, those constituents indicated with the same symbols in the drawings mean the same constituents.

<Fine Fiber Production Method>

The fine fiber production method of the disclosure includes the steps of: discharging a flowable polymer compound from a discharge port provided at an extruder [step A]; forming fibers having a fiber diameter of from 50 nm to 15 μm by spraying, in a direction intersecting with a discharge direction of the flowable polymer compound, a pressurized gas from an air nozzle to the discharged flowable polymer compound, the air nozzle comprising a temperature control member and a spindle-shaped nozzle or a De Laval nozzle [step B]; and collecting the fibers using a collection member provided downstream in a gas spraying direction [step C].

The fine fiber production method may further include additional step(s).

The fine fiber production method of the disclosure is described below referring to the drawings.

FIG. 1 is a schematic structural view illustrating one embodiment of a fine fiber production apparatus used for the fine fiber production method of the disclosure.

A fine fiber production apparatus 10 represents an example using a melt extruder as an extruder 12 which supplies a flowable polymer compound. The melt extruder 12 includes: an apparatus main body equipped with a screw that melts and extrudes a thermoplastic resin; and discharge ports 14 that discharge the flowable polymer compound supplied from the melt extruder 12.

The flowable polymer compound is not particularly restricted as long as it is a polymer compound that is in a state where it can be transferred from the extruder to the discharge ports by being pressurized and discharged from the discharge ports while maintaining the flowability. Examples of the flowable polymer compound include: polymer compounds that exhibit flowability when heated; polymer compounds that are dissolved or dispersed in a solvent; and resin precursor-containing liquids that undergo a reaction to be cured by heating.

The flowable polymer compound to be discharged from the discharge ports while maintaining its flowability may be discharged continuously or intermittently. When the flowable polymer compound is discharged continuously, the flowable polymer compound linearly flows downward in the gravity direction. Depending on the condition, however, the flow of the flowable polymer compound may be interrupted even when the flowable polymer compound is discharged continuously. When the flowable polymer compound is discharged intermittently from the discharge ports, the flowable polymer compound in a fluid state is discharged in the form of droplets.

The fine fiber production apparatus further includes air nozzle members 16, which are equipped with a gas pressurization unit 18 and a temperature control member 20 and spray a gas against the flowable polymer compound supplied from the discharge ports 14 in a heated fluid state in a direction intersecting with the fluid discharge direction.

From the standpoint of attaining a faster flow rate of the supplied gas as compared to ordinary nozzles, it is preferable that the tips of the air nozzles are equipped with a spindle-shaped nozzle or a De Laval nozzle.

Figure 2:
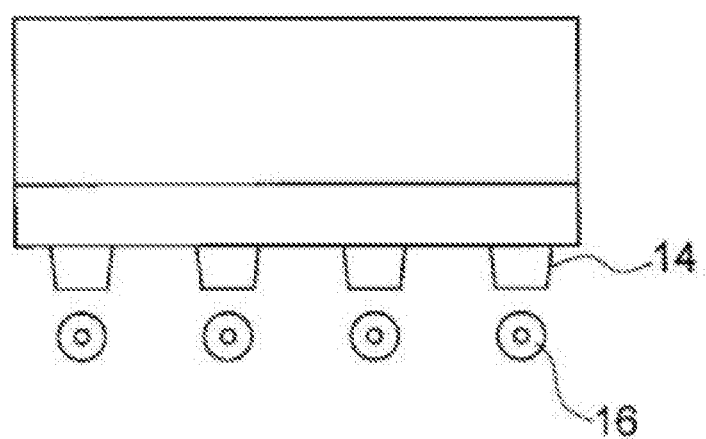
FIG. 2 is a side view obtained by observing a vicinity of discharge ports of the fine fiber production apparatus illustrated in FIG. 1 from the side of air nozzle tips.

FIG. 2 is a side view obtained by observing a vicinity of the discharge ports 14 of the fine fiber production apparatus illustrated in FIG. 1 from the side of the air nozzle tips and illustrates the arrangement positions of the discharge ports 14 and the air nozzle members 16. FIG. 1 illustrates an example in which the flowable polymer compound is discharged in the form of droplets; however, the invention is not restricted thereto, and the flowable polymer compound may be discharged continuously, not in the form of droplets.

From the standpoint of accurately spraying a gas against the flowable polymer compound discharged from the discharge ports 14 in a direction intersecting with the droplet discharge direction, an embodiment in which, as illustrated in FIG. 2, one air nozzle member 16 is provided for one discharge port 14 on the lower side of each discharge port 14 is preferable.

[Step A]

In the step A, the flowable polymer compound is discharged from the discharge ports arranged on the extruder.

When the flowable polymer compound is a flowable resin obtained by melting a thermoplastic resin, a melt extruder may be employed as the extruder, and discharge of the heat-fluidized thermoplastic resin may be performed by heating, melting, kneading and extruding it using the melt extruder.

Meanwhile, when the flowable polymer compound is a solution or a dispersion of a thermosetting resin, or a solution or a dispersion of at least one biocompatible polymer compound selected from the group consisting of proteins and polysaccharides, any apparatus may be employed with no particularly restriction as long as it is capable of extruding and thereby transferring the flowable polymer compound to the discharge ports without heating. As the extruder, any apparatus that is equipped with a transfer member for supplying a flowable substance to the discharge ports, such as an extrusion pump, can be preferably employed.

Examples of the extrusion pump that is a member for transferring the flowable polymer compound include: displacement pumps such as a gear pump, a plunger pump, a screw pump, and a tube pump; and non-displacement pumps such as a centrifugal pump, an axial flow pump, and a mixed flow pump.

In this manner, a variety of flowable polymer compounds can be transferred to the discharge ports and discharged therefrom using a generally used extruder, such as a melt extruder or a transfer member equipped with an extrusion pump.

In FIG. 1, the discharge port 14 is arranged in the gravity direction at the tip of the melt extruder 12; however, the position of the discharge port 14 is not restricted to the mode illustrated in FIG. 1.

The amount of the fine fibers to be produced, the diameter of the fine fibers and the like can be controlled by controlling the discharge amount, the discharge state and the like of the flowable polymer compound. Examples of the discharge state include a state in which the flowable polymer compound is continuously discharged in such a manner to linearly flow downward, and a state in which the flowable polymer compound is intermittently discharged as droplets.

A preferable mode of the flowable polymer compound is, for example, a thermoplastic resin. The thermoplastic resin is not particularly restricted, and any thermoplastic resin that is generally used in the production of a nonwoven fabric can be used in the production method of the disclosure.

Thermoplastic resins that can be used in the production method of the disclosure are exemplified below. The numerical values stated along with the respective resin names each represent the melting point of the resin of interest, which is indicated with a range that varies depending on the grade. It is noted here that the thermoplastic resin used in the production method of the disclosure is not restricted to the following examples.

Examples of the thermoplastic resin include: olefin resin homopolymers (such as polyethylenes (PE: from 100° C. to 130° C.) and polypropylenes (PP: from 160° C. to 170° C.) and olefin monomer-containing copolymers; polystyrenes (PS: 240° C.); polyvinyl chlorides (from 85° C. to 210° C.); and acrylonitrile-butadiene-styrene resins (ABS: from 100° C. to 120° C.). Further, a so-called engineering plastic, that has superior heat resistance, can be used, and examples thereof include: polymethylpentenes (from 220° C. to 240° C.) which has 4-methylpentene-1 as a main component and which is a special example of olefin resins; ester resins, such as polyethylene terephthalate (PET: from 240° C. to 260° C.) and polyethylene naphthalate (PEN: from 250° C. to 280° C.); polycarbonates (PC: from 140° C. to 150° C.); polyamide resins, such as nylon 6 (from 220° C. to 230° C.) and nylon 66 (from 260° C. to 270° C.); polyphenylene sulfides (PPS: from 280° C. to 290° C.); polyether imides (PEI: from 210° C. to 220° C.); and polysulfonates (PSU: from 200° C. to 210° C.).

As the flowable polymer compound, a thermoplastic elastomer can also be used. Examples of the thermoplastic elastomer include ester elastomers (TPEE: from 170° C. to 240° C.), amide elastomers (TPAE: from 120° C. to 170° C.), olefin elastomers (TPO: from 100° C. to 120° C.), and styrene elastomers (TPS: from 80° C. to 100° C.).

As a thermoplastic flowable polymer compound, a commercially available product may be used as well, and examples thereof include: super engineering plastics containing 4-methylpentene-1 as a main component, such as TPX (registered trademark, manufactured by Mitsui Chemical, Inc.); and polyester elastomers, such as HYTREL (registered trademark, manufactured by Du Pont-Toray Co., Ltd.).

The thermoplastic resins may be used singly, or in combination of two or more thereof as a mixture.

From the standpoint of further reducing the diameter of the resulting fine fibers, the melt flow rate (hereinafter, may be referred to as "MFR"), which is determined in accordance with the method prescribed in ISO 1133 (JIS K7210:1999), is in a range of preferably from 1 g/10 min to 2,500 g/10 min, more preferably from 300 g/10 min to 2,500 g/10 min, still more preferably from 600 g/10 min to 1,800 g/10 min.

The MFR of the thermoplastic resin can be adjusted by, for example, adding thereto a plasticizer, a solvent, a compatible thermoplastic resin and/or the like.

As for the viscosity of the thermoplastic resin, the melt flow rates of some resins cannot be accurately determined by the melt flow rate measurement method described in ISO 1133 and JIS K7210; therefore, depending on the physical properties, the viscosity of the thermoplastic resin may be evaluated in terms of, for example, shear viscosity, which is a viscosity value determined by the method described in ISO 1628 and JIS K7367.

For instance, the shear viscosity of the resin, which is determined by the method described in ISO 1628-1 and JIS K7367-1, is preferably in a range of from 50 mPa·s to 100,000 mPa·s, more preferably in a range of from 100 mPa·s to 50,000 mPa·s.

When the thermoplastic resin is a polyester resin, it cannot be accurately measured in terms of the melt flow rate, and reference can be made to the intrinsic viscosity (IV) determined by the method described in ISO 1628-5 and JIS K7367-5.

The IV value of the polyester resin used as the thermoplastic resin, which is determined by the above-described measurement method, is preferably from 0.1 dL/g to 1.3 dL/g, more preferably from 0.3 dL/g to 0.8 dL/g, still more preferably from 0.4 dL/g to 0.7 dL/g.

From the standpoint of further reducing the diameter of the resulting fine fibers, the amount of the thermoplastic resin to be discharged is preferably in a range of from 0.5 g/min to 250 g/min, more preferably in a range of from 1.0 g/min to 150 g/min.

Another mode of the flowable polymer compound is, for example, a thermosetting resin. Examples of the thermosetting resin include epoxy resins, melamine resins, urethane resins, silicone resins, urea resins, and phenol resins.

When a thermosetting resin is used, the initial viscosity thereof at the time of being discharged from the melt extruder is preferably 100,000 mPa·s or less, more preferably 10,000 mPa·s or less.

In the present specification, the term "thermosetting resin" is used with a meaning that encompasses uncured thermosetting resin precursors, thermosetting resin solutions, and the like. In other words, the term "thermosetting resin" used herein may refer to a single-component liquid-type thermosetting resin that is cured by oxygen or moisture in the air, or a two-component liquid-type resin precursor composed of a solution of a thermosetting resin and a liquid containing an initiator that facilitates curing of the thermosetting resin.

A third mode of the flowable polymer compound is, for example, a solution of a polymer compound. Examples of a polymer compound that can be dissolved in an arbitrary solvent include: water-soluble polymer compounds such as polyvinyl alcohols, water-soluble cellulose, pectin, alginic acid, glucomannan, chitin, chitosan, and crystalline cellulose; and solvent-soluble polymer compounds such as polylactic acids, proteins, and saccharides. Further, a dispersion of a polymer compound that can be dispersed as fine particles in an appropriate dispersion medium such as water can also be used as the flowable polymer compound even if the polymer compound itself is not soluble in a solvent such as water or an organic solvent.

As such a solution or a dispersion of a polymer compound, a solution or a dispersion of at least one biocompatible polymer compound selected from the group consisting of polyester resins, proteins and polysaccharides can be used. The term "biocompatible polymer compound" used herein encompasses polymer compounds derived from a living body, and polymer compounds that can be applied to a living body (e.g., human body).

Examples of a biocompatible polyester resin that may be used in the present embodiment include homopolymers containing, as their monomers, L-lactic acid, D-lactic acid, glycolic acid, ε-caprolactone or the like; and copolymers containing two or more of these monomer components. The copolymers may be in the mode of a block copolymer or a random copolymer.

Examples of a biocompatible protein that may be used in the present embodiment include pectin, collagen, actin and myosin that are derived from a living body. Examples of a biocompatible polysaccharide include chitin, chitosan, and cellulose.

It is also an advantage of the production method of the present embodiment that fine fibers can be easily formed using a biocompatible polymer compound which generally has low heat resistance and is thus difficult to handle.

When any of the above-described polymer compounds that are soluble in water, dispersible in water or soluble in an appropriate solvent is used, the initial viscosity thereof at the time of being discharged from the extruder is preferably 10,000 mPa·s or less, more preferably 7,000 mPa·s or less.

The initial viscosity can be measured by a rotary viscometer, a falling-ball viscometer or the like that is prescribed in JIS Z8803:2011.

The initial viscosity of the flowable polymer compound can be adjusted by selecting the types and the amounts (i.e., dissolution concentration) of the resin used for the fine fiber formation and the solvent compatible with the polymer compound.

In the step A, the flowable polymer compound to be discharged may be a single flowable polymer compound, or a mixture of two or more flowable polymer compounds.

Further, in the flowable polymer compound(s), for the purpose of, for example, adjusting the physical properties of the resulting fine fibers, a known additive(s) may be incorporated in addition to the polymer compound within a range that does not impair the effects of the present embodiment.

Examples of the known additives include waxes, antistatic agents, coloring agents, antioxidants, weathering stabilizers, light stabilizers, blocking inhibitors, lubricants, softening agents, hydrophilization agents, fillers, antibacterial agents, tackifiers, oil components other than waxes, and compatibilizers. By incorporating a compatibilizer, the uniform mixing property of two or more resin materials that are hardly miscible with each other is improved. Examples of the compatibilizer include UMEX manufactured by Sanyo Chemical Industries, Inc.

[Step B]

The step B is the step of forming fine fibers having a fiber diameter of from 50 nm to 15 μm by spraying a pressurized gas from an air nozzle, which includes a temperature control member and a spindle-shaped nozzle or a De Laval nozzle, against the flowable polymer compound discharged in the step A in a direction intersecting with the discharge direction of the flowable polymer compound.

The temperature of the air supplied from the air nozzles can be selected as appropriate in accordance with the type of the flowable polymer compound being used, the diameter of the desired fine fibers, and the like.

When the flowable polymer compound is a heat-melted thermoplastic resin, the temperature of the air discharged from the air nozzles can be, for example, from 100° C. to 900° C. From the standpoint of further reducing the fiber diameter, the temperature of the hot air discharged from the air nozzles is preferably in a range of from 100° C. to 900° C., more preferably in a range of from 200° C. to 800° C.

In the fine fiber production apparatus illustrated in FIG. 1, each individual air nozzle member 16 may have a temperature control member 20 having a temperature control function. The temperature control member 20 includes a temperature sensor 21 which measures the temperature of the air nozzle member 16, and it is preferable that heating or cooling of air is performed by the temperature control member 20 in accordance with the temperature measured by the temperature sensor 21.

When a mode in which the temperature control member 20 is provided for each individual air nozzle member 16 is adopted, the temperature can be controlled for each air nozzle 16, and air can thus be supplied at different temperatures to each discharge port of the flowable polymer compound. Accordingly, for example, when the flowable polymer compound is a thermoplastic resin, flowability of the thermoplastic resin may be varied depending on the temperature, and this enables to produce fibers of different diameters simultaneously.

It is noted here that it is also possible to control the temperatures of all of the air nozzles 16 in the fine fiber production apparatus 10 using a single temperature control member 20.

When the flowable polymer compound is a thermosetting resin, the temperature of the air discharged from the air nozzles can be, for example, from −40° C. to 400° C., preferably from −20° C. to 300° C.

By spraying the air in this temperature range, cross-linking reaction of the thermosetting resin having flowability is allowed to proceed, so that fine fibers composed of the thus cured thermosetting resin can be obtained.

Further, by controlling the temperature of the air, not only the reaction can be delayed to maintain the flowability of the thermosetting resin but also the diameter of the resulting fine fibers can be further reduced and/or the fiber length can be further increased.

When a solution of a polymer compound is used as the flowable polymer compound, fine fibers of the polymer compound can be formed at a lower temperature than a case of using the above-described thermoplastic resin or thermosetting resin.

Among solutions of polymer compounds, for example, because of the possibility of a biocompatible polymer compound selected from the group consisting of proteins and polysaccharides to be denatured by heating, the air to be supplied is preferably maintained at a low temperature.

In the case of the present embodiment, since the air is used mainly for the purpose of removing a solvent from the solution of the polymer compound, the temperature of the air can be from −40° C. to 300° C., preferably from −20° C. to 200° C. The temperature of the air may be selected as appropriate taking into consideration the physical properties of the polymer compound being used.

Further, when the flowable polymer compound is dissolved in a solvent to be used as a solution or dispersed in a dispersion medium to be used as a dispersion, cold air of −30° C. or lower can be supplied from the air nozzles in order to freeze-dry the solution or the dispersion.

Air nozzles that may be used in the present invention are not particularly restricted. The air nozzles in the present embodiment are each preferably equipped with, at their tips, a spindle-shaped nozzle or a De Laval nozzle. By arranging a spindle-shaped nozzle or a De Laval nozzle, the speed of the air discharged from the air nozzles can be controlled to be 30 msec or faster and, the air can be supplied at a speed faster than the sonic speed (e.g., at a speed of 340 msec or faster) by adjusting the air pressurization conditions. The air can also be supplied at a speed of 1,200 msec or faster.

The speed of the air can be adjusted as appropriate taking into consideration properties of the polymer compound or the diameter of the desired fibers. Usually, the air speed is preferably from 30 msec to 1,000 msec, more preferably from 340 msec to 800 msec.

For example, the fiber diameter can be further reduced by increasing the air speed within the above-described range. Accordingly, nanofibers can be formed by increasing the air speed. Further, by lowering the air speed within the above-describe range, fibers of a sub-micron or micron size can be obtained.

The air supplied from the air nozzle 16 can be adjusted by controlling the conditions of the pressurization performed by the gas pressurization unit 18. As the gas pressurization unit 18, any known compressor or the like can be employed. In the production method of the present embodiment, the air supplied from plural air nozzles 16 can be pressurized by a single gas pressurization unit 18.

Alternatively, depending on the intended purpose, the speed of the air supplied from each air nozzle 16 can be controlled by individual gas pressurization unit 18.

In this manner, by controlling the temperature and speed of the air supplied from the plural air nozzle members 16 separately, a mixture of fine fibers having different diameters from each other can be formed using a single apparatus in a single step.

The fine fibers obtained by the production method of the present embodiment may be single fibers (monofilaments), or multifilaments as a fiber assembly. When multifilaments (fiber assembly) are obtained, the multifilaments may have a fiber diameter in the above-described range of fine fibers.

The step B may further include the heating step of increasing an ambient temperature in a vicinity of the flowable polymer compound discharged from the discharge port.

By increasing the ambient temperature in a vicinity of the flowable polymer compound discharged from the discharge ports, the flowability of the flowable polymer compound discharged from the discharge ports is maintained over a longer period of time, so that finer fibers can be formed.

Figure 3:
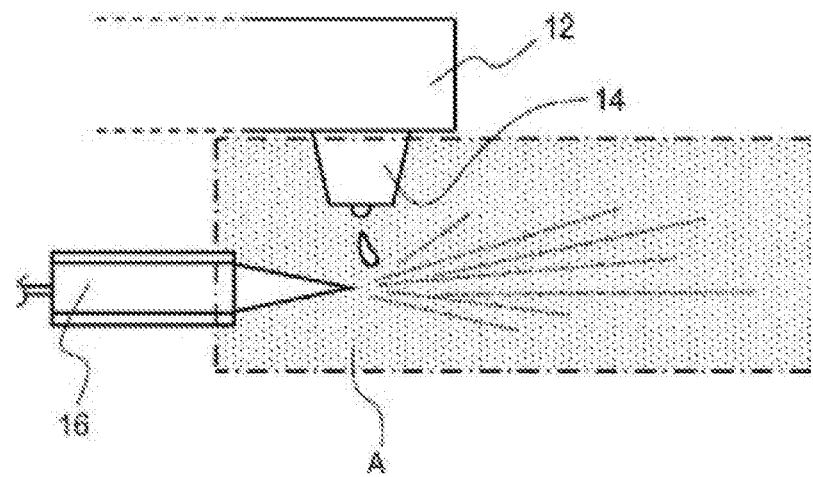
FIG. 3 is a schematic structural view illustrating one embodiment of a region heated by a heating device in the fine fiber production apparatus used for the fine fiber production method of the disclosure.

Examples of a preferable heating region include a region in a vicinity of the discharge ports 14 where the air supplied from the air nozzles 16 strikes the discharged flowable polymer compound, such as a region A indicated by halftone screen in FIG. 3. By heating the region A illustrated in FIG. 3, the droplets of the flowable polymer compound discharged from the discharge ports 14 are continuously heated while passing through the region A, so that the flowability can be maintained over a long period.

As for the heating conditions, it is preferable to heat the region A illustrated in FIG. 3 to, for example, a temperature of equal to or higher than the softening point of the flowable polymer compound using a heating device. By heating the region A to a temperature of equal to or higher than the softening point of the flowable polymer compound, the resin flowability can be maintained over a long period and the flowable polymer compound is thus likely to be elongated more when blown with the air, so that the diameter of the resulting fibers can be further reduced.

As for the heating conditions, from the standpoint of allowing the flowable polymer compound to maintain a molten state over a longer period, it is more preferable to perform the heating at a temperature of equal to or higher than the melting point of the flowable polymer compound.

In the heating conditions, the upper limit of the temperature is not particularly restricted; however, in view of being free from concern an affecting the physical properties of the flowable polymer compound and the durability of the equipments and in view of economic efficiency and the like, the temperature is preferably equal to or lower than 800° C.

The heating method is not particularly restricted as long as it is capable of controlling the flowability of the flowable polymer compound, and any known heating method can be applied as appropriate.

As the heating device, a device equipped with a temperature control means is preferable.

Examples of the heating device used for the heating method include a hot air generator capable of heating a wide range, and a heater capable of performing local heating.

Examples of the hot air generator include blowers and fan heaters that supply hot air. Further, a heat gun or the like that locally supplies hot air at a higher temperature can be used as well. Examples of the heaters include: far-infrared heaters using a nichrome wire, a halogen lump or the like for heating; and oil heaters and panel heaters, which emit heat from themselves to heat the surrounding air and the like.

As the heating region, it is preferable to heat not only a vicinity of the air discharge section but also a region as large as possible so that it ranges from where the discharged flowable polymer compound in a fluid state is blown by the air to where the discharged flowable polymer compound is collected as fine fibers, since this enables to maintain the flowability of the droplets of the flowable polymer compound over a longer period and to thereby further reduce the diameter of the resulting fibers.

[Step C]

The step C is the step of collecting the fibers formed in the step B using a collection member arranged in the gas spraying direction.

As the collection member, a member similar to a fiber collection member of any known nonwoven fabric production apparatus can be used. The collection member is configured to include a mesh having such a pore size that does not allow fine fibers to pass therethrough. In order to efficiently collect the fibers, a suction member may be arranged on the opposite side of the fiber-supplied side. By performing suction using the suction member on the opposite side of the fiber-supplied side, the fibers can be collected more efficiently.

As the collection member, for example, a drum-like collection member or a net-like collection member can be used as well.

In the step C, the collected fibers can be made into a sheet. That is, the step C may include collecting the fibers so that the fibers form a sheet form on a nonwoven fabric. When a fiber assembly thus collected on the nonwoven fabric is made into a uniform elongated sheet, the collection member may include a winding section. In this case, the fiber assembly collected by the collection member is rolled up by the winding section, as a result of which a continuous elongated fiber assembly, that is, a fiber assembly made into a sheet form is obtained.

When the collected fibers are obtained as an aggregate, a screen-form net may be used as the collection member. The screen-form net is arranged such that the net surface is perpendicular to the air supplying direction. By using a screen-form net as the collection member, the fibers collected on the net are accumulated in the form of an aggregate, so that the fiber assembly collected by the collection member is obtained as a fiber aggregate.

The assembly of the fine fibers collected by such a collection device may be used as is or, for example, a part of the fibers may be fused together to form a nonwoven fabric made of the fine fibers.

According to the method of the present embodiment, fine fibers having different diameters from one another can be produced simultaneously; therefore, for example, a fiber assembly which has a compact structure and contains resilient fibers of a larger diameter can be produced. The thus produced fiber assembly has compressive strength and is close since it contains fibers of a very small diameter as well as fibers of a larger diameter.

<Fine fiber Production Apparatus>

One representative example of the fine fiber production apparatus of the present embodiment is the fine fiber production apparatus 10 illustrated in FIG. 1. As illustrated in FIG. 1, the fine fiber production apparatus 10 includes: a melt extruder 12, which is equipped with plural discharge ports 14 and configured to discharge a flowable polymer compound from each of the discharge ports 14; an air nozzle member(s) 16 arranged in a vicinity of the plural discharge ports 14 of the melt extruder 12 and including a De Laval nozzle or a spindle-shaped nozzle, the air nozzle member 16 being equipped with a gas pressurization unit 18, that is configured to pressurize a gas to be sprayed in a direction intersecting with a discharge direction of the flowable polymer compound discharged from the discharge ports 14, and a temperature control member 20 that is configured to control the temperature of the gas, such as an air heater (not illustrated); and a collection member (not illustrated) which are configured to collect formed fibers.

In the fine fiber production apparatus, the arrangement position of the air nozzle member 16 can be arbitrarily moved in the vertical direction and the horizontal direction in accordance with the intended purpose. Further, the arrangement angle of the air nozzle member 16 can also be changed, and the air supply direction with respect to the flowable polymer compound can be modified by changing the arrangement angle.

When there are plural air nozzle members 16, it is preferable that the temperature control member is provided for each of the air nozzle members 16. By arranging the temperature control members 20 which are each independently capable of controlling the temperature of the corresponding air nozzle member 16, airs discharged from the plural air nozzle members 16 at different temperatures can be used in combination. This enables to produce fine fibers of different diameters simultaneously.

The temperature control member 20 is not particularly restricted as long as it is a device capable of controlling the temperature of the air supplied to droplets of the flowable polymer compound. For example, a temperature control device capable of performing cooling and heating when an electric current is applied thereto can be used. For example, as illustrated in FIG. 1, the temperature control member 20 can be configured to control the air temperature by cooling or heating each air nozzle member 16 based on the temperature measured by a temperature sensor 21 arranged on each air nozzle member 16. Further, when only heating is performed, the temperature control member 20 can be a member having a simple configuration.

The fine fiber production apparatus of the disclosure may further include a heating device which increases the ambient temperature in a vicinity of the flowable polymer compound discharged from the above-described discharge ports.

Figure 4:
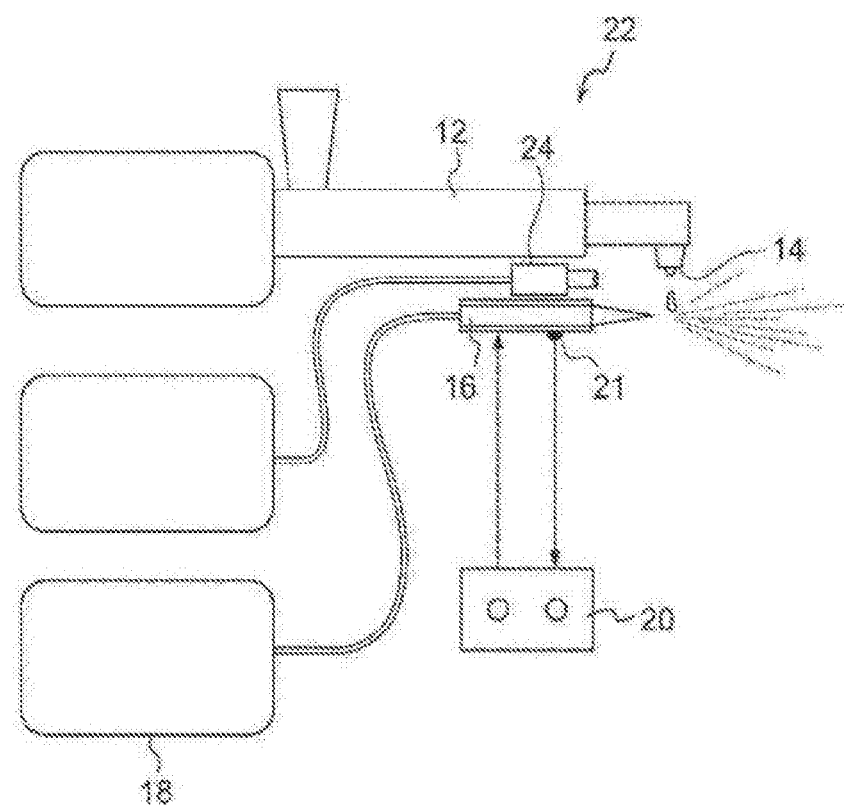
FIG. 4 is a schematic structural view illustrating one embodiment of a fine fiber production apparatus used for the fine fiber production method of the disclosure, which apparatus includes a heating device that heats a vicinity of discharge ports.

FIG. 4 is a schematic structural view illustrating one example of a fine fiber production apparatus 22, which includes a heating device 24 that increases the ambient temperature in a vicinity of the flowable polymer compound discharged from the discharge ports.

The fine fiber production apparatus 22 illustrated in FIG. 4 includes the heating device 24 between the plural discharge ports 14, which are connected to the melt extruder 12, and the air nozzles 16. In the present embodiment, a device which supplies a heated gas therefrom is adopted as the heating device illustrated in FIG. 4.

Figure 5:
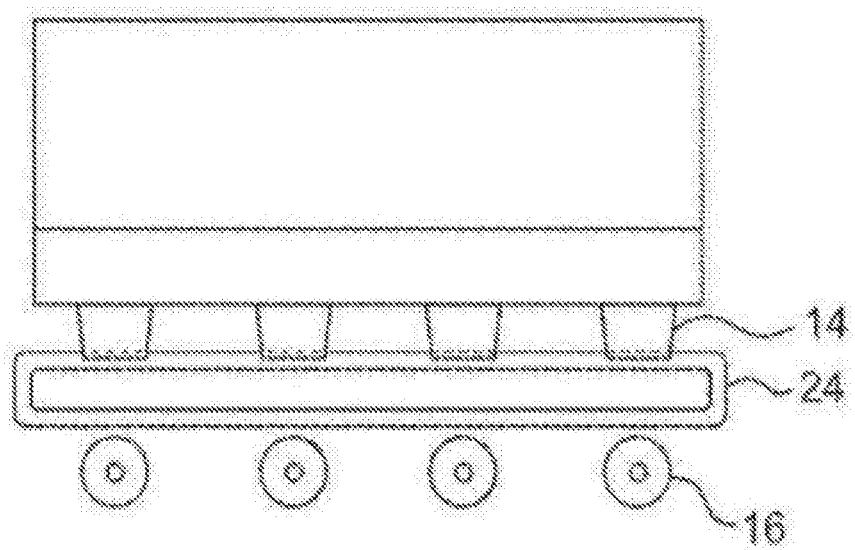
FIG. 5 is a side view obtained by observing a vicinity of the discharge ports of the fine fiber production apparatus illustrated in FIG. 4 from the side of air nozzle tips.

FIG. 5 is a side view obtained by observing a vicinity of the discharge ports 14 of the fine fiber production apparatus 22 illustrated in FIG. 4 from the side of the air nozzle tips and illustrates the arrangement positions of the discharge ports 14, tips of the air nozzle members 16, and a heated gas supply port of the heating device 24.

As illustrated in FIG. 5, in the present embodiment, from the standpoint of efficiently heating the droplets of the flowable polymer compound discharged from the discharge ports 14, the heating device 24 is arranged between the discharge ports 14 and the air nozzle members 16 in order to spray a heated gas in a direction intersecting with the discharge direction of the droplets. The peripheral regions of the droplets of the discharged flowable polymer compound are maintained to have a high ambient temperature by the heated gas supplied from the heating device 24. Therefore, the droplets of the flowable polymer compound can maintain a fluid state over a long period.

Figure 6:
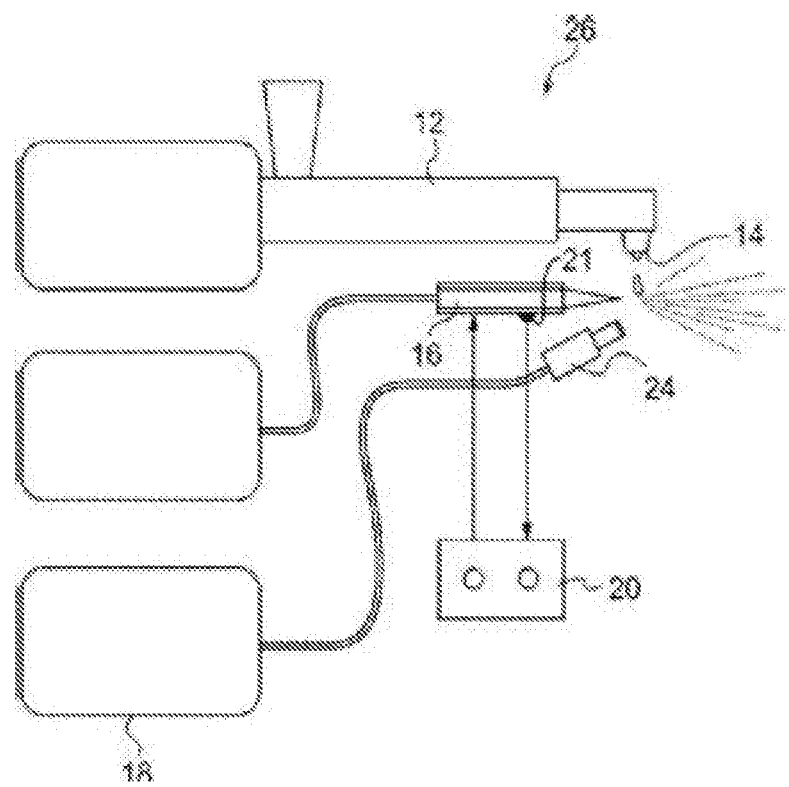
FIG. 6 is a schematic structural view illustrating another embodiment of the fine fiber production apparatus used for the fine fiber production method of the disclosure, which apparatus includes a heating device that heats a vicinity of discharge ports.

FIG. 6 is a schematic structural view illustrating a fine fiber production apparatus 26 including the heating device 24, that is another example. The fine fiber production apparatus 26 illustrated in FIG. 6 includes the heating device 24 underneath the plural discharge ports 14, which are connected to the melt extruder 12, and the air nozzles 16. The heating device 24 illustrated in FIG. 6, which supplies a heated gas, is arranged on the gravity-direction lower side of the air nozzles 16, and the heated gas is thus supplied from the lower side of the droplets of the flowable polymer compound discharged from the discharge ports 16. Since the heated gas diffuses toward the gravity-direction upper side, the mode illustrated in FIG. 6 enables to increase the ambient temperature efficiently.

Figure 7:
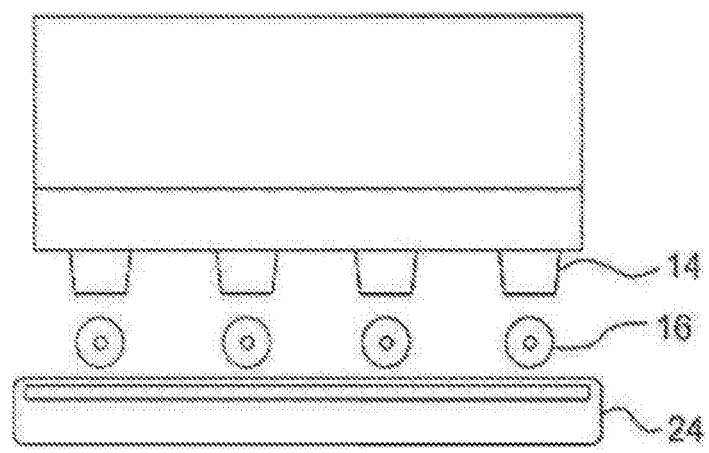
FIG. 7 is a side view obtained by observing a vicinity of the discharge ports of the fine fiber production apparatus illustrated in FIG. 6 from the side of air nozzle tips.

FIG. 7 is a side view obtained by observing a vicinity of the discharge ports 14 of the fine fiber production apparatus 26 illustrated in FIG. 6 from the side of the air nozzle tips and illustrates the arrangement positions of the discharge ports 14, the tips of the air nozzle members 16, and a heated gas supply port of the heating device 24.

As illustrated in FIG. 7, in the present embodiment, by arranging the heating device 24 on the lower side of the discharge ports 14 and the air nozzle members 16, the peripheral regions of the droplets of the discharged flowable polymer compound are maintained to have a high ambient temperature because of the heated gas supplied from the heating device 24. Therefore, the droplets of the flowable polymer compound can maintain a fluid state over a long period.

When a device which supplys a heated gas, such as a hot air generator, is used as the heating device, it is preferable that the device does not interfere with the flow path of the air sprayed from the air nozzles 16 against the flowable polymer compound.

For example, a mode of supplying a gas at an angle substantially parallel to the flow path of the air is considered as a preferable mode. This is because it does not interfere the flow path of the air, which is useful for the fine fiber production. Further, it supplies a heated gas in the flying direction of the flowable polymer compound.

However, usually, since the flow rate of the air is sufficiently faster than that of a heated gas supplied from a hot air generator or the like, the flow path of the air is hardly affected by the heated gas. Therefore, it is also possible to heat the periphery by supplying a gas at an angle with respect to the flow path of the air, for example, at an angle of 90° or an angle close to 90° with respect to the flow path of the air.

When a heater, a ceramic heater or the like is used, it is preferably arranged on a side or the perimeter of the region where the air nozzles 16 are arranged. Further, as long as the flow path of the air supplied from the air nozzles is not interfered, the heater may be arranged in the periphery of the flow path of the air. By arranging the heater in the periphery of the flow path of the air, for example, the region represented by A in FIG. 3 (region A) can be heated efficiently.

The collection member is selected as appropriate in accordance with the intended purpose thereof. The collection member preferably includes a mesh having such a pore size that does not allow the resulting fine fibers to pass therethrough. In order to efficiently collect the fibers, a suction member may be arranged via the mesh on the opposite side of the fiber-supplying side.

Examples of the collection member include a collection drum, a screen-form collection net, and a sheet-form collection net. Further, a nonwoven fabric may be arranged in advance on the surface of the collection member to collect the resulting fine fibers on the nonwoven fabric.

The diameters of the thus obtained fine fibers can be measured by the following method.

For example, the thus obtained fiber assembly can be measured by multi-fiber diameter measurement/observation on a scanning electron microscope (SEM) image, fiber length observation under a light microscope, or visual observation of fiber length (lengths of fibers connecting the discharge ports and the collection section). In the present specification, a value obtained by measuring diameters of fibers at no less than 100 arbitrarily selected points in a visual field on an SEM image and then calculating an average of the measured diameter values is adopted as the diameter.

According to the fine fiber production method and fine fiber production apparatus of the present embodiment, fine fibers of various diameters ranging from extremely fine fibers having a nano-order diameter to fibers having a micron-order diameter can be produced in a simple manner using a known general-purpose melt extruder or material extruder, and the method and the apparatus are applicable to a broad range.

EXAMPLES

The above-described embodiments are explained below more concretely by way of examples thereof; however, the embodiments are not restricted to the following examples.

(Fine Fiber Production Apparatus)

A short-screw extruder was employed as a melt extruder. Discharge ports 14 were formed by fitting a resin outlet section of the short-screw extruder with a special die with openings each having a diameter of 0.4 mm in the gravity direction.

As illustrated in FIG. 2, an air nozzle member 16 equipped with one temperature control member 20 and a De Laval nozzle was arranged on a side of each of the discharge ports 14. The distance from each discharge port 14 to the air vent of each air nozzle 16 was set at 10 mm in the vertical direction and 5 mm in the horizontal direction (i.e., in the direction perpendicular to the gravity direction). The distance between these members can be adjusted to be shorter.

Example 1

<Production of Fine Fibers>

A thermoplastic resin PP (manufactured by SunAllomer Ltd., product name: PWH00M, MFR (230° C., 2.16-kg load): 1,700 g/10 min) was fed via an input port of the short-screw extruder and melt-extruded by heating at 300° C., and the resulting molten thermoplastic resin was discharged from each of the discharge ports at a rate of 2 g/min.

Toward the thus discharged molten resin, air was sprayed from the De Laval nozzle-equipped air nozzles 16 at a temperature of 700° C. and an air speed of 600 m/sec, whereby fine fibers were formed.

The thus formed fine fibers were collected by a collection member provided downstream of the air spraying direction.

An average value of the fiber diameter was calculated by the above-described method with measuring fiber diameters at 200 points arbitrarily selected from the thus obtained fine fibers. As a result, the fine fibers were found to have an average diameter of 500 nm and an average length of 100 mm or more.

From the results of Example 1, it is understood that fine fibers having a nano-order diameter can be obtained by a simple method using a general-purpose apparatus.

Example 2

<Production of Fine Fibers>

As a thermosetting resin, urethane (manufactured by Polysis Co., Ltd., product name: POLYCRYSTAL P18 No. 5 (20,000 mPa·s)) was discharged from each of the discharge ports at a rate of 2 g/min using a cylinder-type extruder and a static mixer.

Toward the thus discharged thermosetting resin, air was sprayed from the De Laval nozzle-equipped air nozzles 16 at a temperature of 250° C. and an air speed of 450 m/sec, whereby fine fibers were formed.

The thus formed fine fibers were collected by a collection member provided downstream of the air spraying direction.

An average value of the fiber diameter was calculated by the above-described method with measuring fiber diameters at 200 points arbitrarily selected from the thus obtained fine fibers. As a result, the fine fibers were found to have an average diameter of 700 nm and an average length of 100 mm or more.

From the results of Example 2, it is understood that, even when a thermosetting resin is used, fine fibers having a nano-order fiber can be obtained by a simple method using a general-purpose apparatus.

Example 3

<Production of Fine Fibers>

A 1%-by-mass aqueous dispersion of nanocellulose was discharged from each of the discharge ports at a rate of 1 g/min using a cylinder-type extruder.

Toward the thus discharged aqueous dispersion, air was sprayed from the De Laval nozzle-equipped air nozzles 16 at a temperature of 150° C. and an air speed of 380 m/sec, whereby fine fibers were formed.

The thus formed fine fibers were collected by a collection member provided downstream of the air spraying direction, as a result of which a laminate of fine fiber assembly was obtained.

Measurement of the fiber diameter was performed for the thus obtained fine fiber assembly by the above-described method. As a result, the fibers observed in an assembly state were found to have an average diameter of 400 nm, and the fibers of the laminate of fine fiber assembly were found to have an average length of 2 mm or more.

From the results of Example 3, it is understood that a fiber assembly having a nano-order fiber diameter, that is, a fine cellulose multifilament can be obtained by a simple method using a readily-available nanocellulose aqueous dispersion and a general-purpose apparatus.

Example 4

<Production of Fine Fibers>

A thermoplastic resin PP (manufactured by SunAllomer Ltd., product name: PWH00M, MFR (230° C., 2.16-kg load): 1,700 g/10 min) was fed via an input port of the short-screw extruder and melt-extruded by heating at 300° C., and the resulting molten thermoplastic resin was discharged from each of the discharge ports at a rate of 2 g/min.

In Example 4, fine fibers were produced in the same manner as in Example 1, except that the apparatus equipped with the heating device 24, which is illustrated in FIG. 4, was used as a fine fiber production apparatus, and that a gas heated to 400° C. was supplied from the heating device 24 toward the discharged droplets.

In other words, air was sprayed from the De Laval nozzle-equipped air nozzles 16 toward the thus discharged molten resin droplets in the heated region, at a temperature of 700° C. and an air speed of 600 m/sec, whereby fine fibers were formed.

The thus formed fine fibers were collected by a collection member provided downstream of the air spraying direction.

An average value of the fiber diameter was calculated by the above-described method with measuring fiber diameters at 200 points arbitrarily selected from the thus obtained fine fibers. As a result, the fine fibers were found to have an average diameter of 300 nm and an average length of 100 mm or more.

Comparing the results of Example 4 with the results of Example 1, it is understood that fine fibers having a smaller diameter can be obtained by increasing the ambient temperature using a heating device.

Example 5

<Production of Fine Fibers>

A thermoplastic resin PP (manufactured by SunAllomer Ltd., product name: PWH00M, MFR (230° C., 2.16-kg load): 1,700 g/10 min) was fed via an input port of the short-screw extruder and melt-extruded by heating at 300° C., and the resulting molten thermoplastic resin was discharged from each of the discharge ports at a rate of 2 g/min.

In Example 5, non-heated air, that is, air having a temperature of 25° C. was sprayed from the De Laval nozzle-equipped air nozzles 16 at an air speed of 40 msec to form fine fibers.

The thus formed fine fibers were collected by a collection member provided downstream of the air spraying direction.

An average value of the fiber diameter was calculated by the above-described method with measuring fiber diameters at 200 points arbitrarily selected from the thus obtained fine fibers. As a result, the fine fibers were found to have an average diameter of 2800 nm and an average length of 100 mm or more.

From the results of Example 5, it is understood that fine fibers having a diameter that may be put to practical use can be obtained under more moderate conditions even without heating of the air supplied from the air nozzles 16.

Example 6

<Production of Fine Fibers>

A thermosetting resin PET (manufactured by Bell Polyester Products, Inc., product name: TK3, IV value: 0.65) was fed via an input port of the short-screw extruder and melt-extruded by heating at 340° C., and the resulting molten thermoplastic resin was discharged from each of the discharge ports at a rate of 2 g/min.

Toward the thus discharged molten resin, air was sprayed from the De Laval nozzle-equipped air nozzles 16 at a temperature of 700° C. and an air speed of 600 msec, whereby fine fibers were formed.

The thus formed fine fibers were collected by a collection member provided downstream of the air spraying direction.

An average value of the fiber diameter was calculated by the above-described method with measuring fiber diameters at 100 points arbitrarily selected from the thus obtained fine fibers. As a result, the fine fibers were found to have an average diameter of 1400 nm and an average length of 100 mm or more.

Example 7

<Production of Fine Fibers>

A thermoplastic resin PPS (manufactured by Polyplastics Co., Ltd., product name: 0203C6, initial viscosity at the time of discharge: 28,000 mPa·s) was fed via an input port of the short-screw extruder and melt-extruded by heating at 340° C., and the resulting molten resin was discharged from each of the discharge ports at a rate of 2 g/min.

Toward the thus discharged molten resin, air was sprayed from the De Laval nozzle-equipped air nozzles 16 at a temperature of 600° C. and an air speed of 600 m/sec, whereby fine fibers were formed.

The thus formed fine fibers were collected by a collection member provided downstream of the air spraying direction.

An average value of the fiber diameter was calculated by the above-described method with measuring fiber diameters at 100 points arbitrarily selected from the thus obtained fine fibers. As a result, the fine fibers were found to have an average diameter of 1600 nm and an average length of 100 mm or more.

Example 8

<Production of Fine Fibers>

A thermoplastic elastomer TPEE (manufactured by Du Pont-Toray Co., Ltd., product name: HYTREL (registered trademark) 5557, MFR (230° C., 2.16-kg load): 8 g/10 min)) was fed via an input port of the short-screw extruder and melt-extruded by heating at 340° C., and the resulting molten resin was discharged from each of the discharge ports at a rate of 2 g/min.

Toward the thus discharged molten resin, air was sprayed from the De Laval nozzle-equipped air nozzles 16 at a temperature of 700° C. and an air speed of 600 m/sec, whereby fine fibers were formed.

The thus formed fine fibers were collected by a collection member provided downstream of the air spraying direction.

An average value of the fiber diameter was calculated by the above-described method with measuring fiber diameters at 100 points arbitrarily selected from the thus obtained fine fibers. As a result, the fine fibers were found to have an average diameter of 2500 nm and an average length of 100 mm or more.

Example 9

<Production of Fine Fibers>

A thermoplastic resin TPEE (manufactured by Du Pont-Toray Co., Ltd., product name: HYTREL 5557, MFR (230° C., 2.16-kg load): 8 g/10 min)) was fed via an input port of the short-screw extruder and melt-extruded by heating at 340° C., and the resulting molten resin was discharged from each of the discharge ports at a rate of 2 g/min.

In Example 9, fine fibers were produced in the same manner as in Example 8, except that the apparatus equipped with the heating device 24, which is illustrated in FIG. 4, was used as a fine fiber production apparatus, and that a gas heated to 600° C. was supplied from the heating device 24 toward the discharged droplets.

In other words, air was sprayed from the De Laval nozzle-equipped air nozzles 16 toward the thus discharged molten resin droplets in a heated region, at a temperature of 700° C. and an air speed of 600 m/sec, whereby fine fibers were formed.

The thus formed fine fibers were collected by a collection member provided downstream of the air spraying direction.

An average value of the fiber diameter was calculated by the above-described method with measuring fiber diameters at 100 points arbitrarily selected from the thus obtained fine fibers. As a result, the fine fibers were found to have an average diameter of 2000 nm and an average length of 100 mm or more.

Comparing the results of Example 9 with the results of Example 8, it is understood that fine fibers having a smaller diameter can be obtained by increasing the ambient temperature using a heating device.

From the results of Examples 1 to 9, it is understood that fine fibers can be efficiently produced using a variety of flowable polymer compounds by the simple devices and manners, by way of the fine fiber production method of the present disclosure using the fine fiber production apparatus of the present disclosure.

Furthermore, by comparing Example 1 with Example 4 and by comparing Example 8 with Example 9, it was observed that the flowability of droplets are maintained over a longer period of time and fibers having a smaller diameter can be obtained by increasing the ambient temperature in a vicinity of discharged flowable polymer compound.

The disclosure of Japanese Patent Application No. 2016-158236 filed on Aug. 10, 2016, is hereby incorporated by reference in its entirety.

All the documents, patent applications and technical standards that are described in the present specification are hereby incorporated by reference to the same extent as if each individual document, patent application or technical standard is concretely and individually described to be incorporated by reference.

The invention claimed is:

1. A method of producing fine fibers, the method comprising:
   discharging a flowable polymer compound from a discharge port provided at an extruder;
   forming fibers having a fiber diameter of from 50 nm to 15 μm by spraying, in a direction intersecting with a discharge direction of the flowable polymer compound, a pressurized gas discharged from an air nozzle to the discharged flowable polymer compound, the air nozzle being provided on a gravity-direction lower side of the discharge port and comprising a temperature control member and a spindle-shaped nozzle or a De Laval nozzle, and the temperature control member being configured to control a temperature of the pressurized gas; and collecting the fibers using a collection member provided downstream in a gas spraying direction.

2. The method of producing fine fibers according to claim 1, further comprising a heating step of increasing an ambient temperature in a vicinity of the flowable polymer compound discharged from the discharge port.

3. The method of producing fine fibers according to claim 1, wherein the collecting of the fibers includes collecting the fibers on a nonwoven fabric to form a sheet.

4. The method of producing fine fibers according to claim 1, wherein a speed of the gas discharged from the air nozzle is 30 m/sec or more.

5. The method of producing fine fibers according to claim 1, wherein the flowable polymer compound is a heat-melted thermoplastic resin, and a temperature of the gas discharged from the air nozzle is from 100° C. to 900° C.

6. The method of producing fine fibers according to claim 5, wherein a melt flow rate as measured according to ISO 1133, JIS K7210:1999 of the thermoplastic resin is in a range of from 1 g/10 min to 2,500 g/10 min, and an amount of the thermoplastic resin discharged per discharge port is in a range of from 0.5 g/min to 250 g/min.

7. The method of producing fine fibers according to claim 1, wherein the flowable polymer compound is a solution or a dispersion of a thermosetting resin, and a temperature of the gas discharged from the air nozzle is from −40° C. to 400° C.

8. The method of producing fine fibers according to claim 1, wherein the flowable polymer compound is a solution or a dispersion of at least one biocompatible polymer compound selected from the group consisting of polyester resins, proteins and polysaccharides, and a temperature of the gas discharged from the air nozzle is from −40° C. to 300° C.

9. An apparatus for producing fine fibers, the apparatus comprising:

an extruder that comprises a plurality of discharge ports and that is configured to discharge a flowable polymer compound from each of the discharge ports;

an air nozzle member that is provided on a gravity-direction lower side that is in a vicinity of the plurality discharge ports of the extruder and that comprises a De Laval nozzle or a spindle-shaped nozzle, the air nozzle member being equipped with a gas pressurization unit that is configured to pressurize a gas to be discharged from the air nozzle member and sprayed, to the discharged flowable polymer compound, in a direction intersecting with a discharge direction of the flowable polymer compound discharged from the discharge ports, and a temperature control member that is configured to control a temperature of the gas; and a collection member provided downstream in a gas spraying direction and configured to collect formed fibers.

10. The apparatus for producing fine fibers according to claim 9, further comprising a heating device that increases an ambient temperature in a vicinity of the flowable polymer compound discharged from the discharge ports.

11. The apparatus for producing fine fibers according to claim 9, wherein the extruder is a melt extruder.

12. The apparatus for producing fine fibers according to claim 9, wherein the extruder comprises an extrusion pump that pressurizes the flowable polymer compound and thereby transfers the flowable polymer compound to the discharge ports.

* * * * *